(12) United States Patent
Yamada

(10) Patent No.: US 7,626,738 B2
(45) Date of Patent: Dec. 1, 2009

(54) CALIBRATION PROCESS FOR IMAGE FORMING APPARATUS

(75) Inventor: Akihiro Yamada, Nagoya (JP)

(73) Assignee: Brother Kogyo Kabushiki Kaisha (JP)

( * ) Notice: Subject to any disclaimer, the term of this patent is extended or adjusted under 35 U.S.C. 154(b) by 313 days.

(21) Appl. No.: 11/526,590

(22) Filed: Sep. 26, 2006

(65) Prior Publication Data
US 2007/0070460 A1 Mar. 29, 2007

(30) Foreign Application Priority Data
Sep. 27, 2005 (JP) ............................. 2005-280219

(51) Int. Cl.
*H04N 1/46* (2006.01)
*G03G 15/00* (2006.01)
(52) U.S. Cl. ..................... 358/504; 399/11; 399/24
(58) Field of Classification Search ............... 358/1.14, 358/1.15, 504
See application file for complete search history.

(56) References Cited

U.S. PATENT DOCUMENTS

| | | | | |
|---|---|---|---|---|
| 6,243,542 B1* | 6/2001 | Fujimoto et al. | ............... | 399/49 |
| 6,280,105 B1* | 8/2001 | Iida | ............... | 400/74 |
| 6,493,517 B1* | 12/2002 | Hanson | ............... | 399/11 |
| 7,054,019 B1* | 5/2006 | Simpson | ............... | 358/1.15 |
| 7,180,628 B1* | 2/2007 | Motohashi et al. | ........... | 358/1.9 |
| 2004/0032605 A1* | 2/2004 | Regimbal | ............... | 358/1.13 |
| 2004/0136025 A1* | 7/2004 | Moriyama et al. | .......... | 358/1.14 |
| 2005/0068364 A1* | 3/2005 | Kayanaka | ................... | 347/23 |
| 2005/0190407 A1* | 9/2005 | Yokoyama | .................. | 358/2.1 |

FOREIGN PATENT DOCUMENTS

| | | |
|---|---|---|
| JP | 2002172833 | 6/2002 |
| JP | 2002-229278 | 8/2002 |
| JP | 2003025691 | 1/2003 |
| JP | 2004252573 | 9/2004 |
| JP | 2002189391 | 7/2005 |
| JP | 2005-244829 | 9/2005 |
| JP | 2006-235009 | 9/2006 |

OTHER PUBLICATIONS

Notice of Reasons for Rejection for Patent Application No. 2005-280219, Dispatch No. 705049, Mailing Date: Nov. 18, 2008.

* cited by examiner

*Primary Examiner*—Edward L Coles
*Assistant Examiner*—Oleg Roytburd
(74) *Attorney, Agent, or Firm*—Banner & Witcoff, Ltd.

(57) ABSTRACT

An image forming apparatus is capable of minimizing the deterioration of image quality by suspending a calibrating process in a predetermined case while improving user convenience. While in the suspended state, when a predetermined condition is satisfied, the multifunction machine can force the calibrating process in the print job, and when the predetermined condition is not satisfied, the calibrating process is not forced in the print job.

5 Claims, 5 Drawing Sheets

Printing
Calibration Exec? 1(No)

Fig. 4

Printing
Calibration Refused

Fig. 5

CALIBRATION PROCESS FOR IMAGE FORMING APPARATUS

This application claims priority from the Japanese Patent Application No. 2005-280219 filed on Sep. 27, 2005, the entire subject matter of which is incorporated herein by reference.

FIELD OF THE INVENTION

Illustrative aspects of the invention relate to an image forming apparatus.

BACKGROUND

Conventionally, image-forming apparatus, such as a color laser printer, are configured to execute a calibrating process whenever a predetermined condition is satisfied in order to prevent deterioration of image quality. For example, one technique suspends the execution of the calibrating process at a time the calibrating process is undesirable to the user. Such suspension of the calibrating process prevents execution of the calibrating process at a time undesirable to the user and thereby improves user convenience; however, because the suspension is canceled either by the user or after a predetermined time has elapsed, a large quantity of printing may occur without the calibrating process being executed resulting in deterioration of image quality.

SUMMARY

Aspects of the present invention are directed to an image forming apparatus that suspends the calibrating process while minimizing deterioration of image quality by the suspending of the calibrating process and improving user convenience.

BRIEF DESCRIPTION OF THE DRAWINGS

Aspects of the invention will be described in detail with reference to various example structures and the following figures, wherein:

FIG. 4 is an explanatory drawing showing an example of a print process display according to at least one illustrative aspect of the invention.

FIG. 5 is an explanatory drawing showing another example of a print process display according to at least one illustrative aspect of the invention.

DETAILED DESCRIPTION

Illustrative aspects of the present invention will be described with suitable reference to the accompanying drawings. These aspects merely provide examples of the invention, and it is needless to say that the aspects can be suitably modified without departing from the gist of the invention.

Overall Illustrative Configuration

Figure 1:
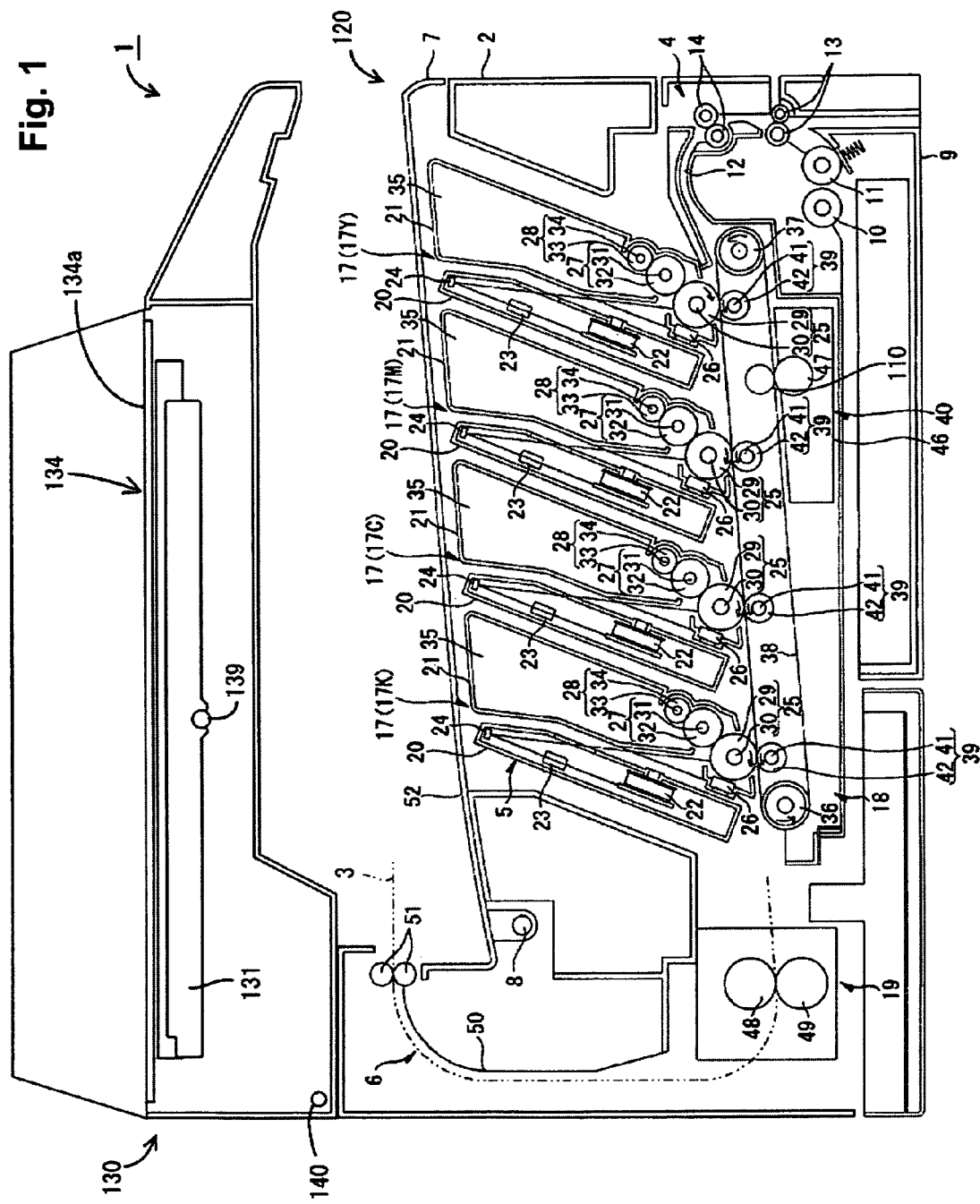
FIG. 1 is a sectional side view schematically showing one aspect of a multifunction machine as the image-forming apparatus according to at least one illustrative aspect of the present invention.

The image-forming apparatus according to an illustrative embodiment is a multifunction machine 1 including a printer function, a scanner function, a copy function, etc., as shown as a sectional side view in FIG. 1. The multifunction machine 1 comprises an image-forming unit 120 containing an image-forming part 5, etc., and an automatic document carrier and read unit (hereafter, referred to as a "reading unit 130"). The reading unit 130 has an image scanner 134 with a rectangular document base 134*a* arranged on the top surface thereof, and an automatic document carrier (not shown) arranged so as to cover the document base 134*a*.

Image-Forming Unit

An image-forming unit 120 is configured as a tandem color laser printer provided with a plurality of processing parts 17 arranged horizontally in parallel. Within a main casing 2 is a paper feeding part 4 for feeding a paper 3 as a recording medium, the image-forming part 5 for forming an image on the fed paper 3, and a paper ejecting part 6 for ejecting the paper 3 on which an image is formed.

From the side view, the main casing 2 has a substantially rectangular box shape and an open upper part with a top cover 7 arranged on top. The top cover 7 is rotatably supported by a cover shaft 8 arranged at the rear side of the main casing 2 (hereafter, the left side is the rear side and the right side is the front side in FIG. 1), and is openably mounted on the main casing 2.

The paper feeding part 4 comprises a paper tray 9 arranged on the bottom of the main casing 2, a pickup roller 10 and a paper feeding roller as the feeding means arranged vertically in front of the paper tray 9, a U-shaped path 12 on the paper feeding side arranged vertically in front of the paper feeding roller 11, and a pair of conveying rollers 13 and a pair of resisting rollers 14 arranged in the middle of the U-shaped path 12 on the paper feeding side.

The paper tray 9 is contractible, with the papers 3 being stacked in the paper tray 9. The paper 3 on the top of the tray is picked up first by the pickup roller 10 and conveyed forward, then fed to the U-shaped path 12 on the paper feeding side by the paper feeding roller 11.

The U-shaped path 12 on the paper feeding side is formed as a conveying path for the nearly U-shaped paper 3 with the upstream end abutting the lower end of the paper feeding roller 11 to feed the paper 3 forward, and the downstream end abutting the upper end of a conveying belt 38 described below to convey the paper 3 backward.

Then, the paper 3 is fed forward to the upstream end of the U-shaped path 12 on the paper feeding side and is conveyed by the conveying roller 13 on the U-shaped path 12 on the paper feeding side to reverse the direction of conveyance, and then conveyed backward after resisting by the resist roller 14.

The image-forming part 5 comprises processing parts 17, a transfer part 18 and a setting part 19. The process parts 17 are provided for each color of a plurality of toner colors. That is, the process part 17 has, for example, four parts including a yellow process part 17Y, a magenta process part 17M, a cyan process part 17C, and a black process part 17K. The process parts 17 are arranged sequentially in parallel so as to be spaced apart front to back and overlap horizontally.

Each process part 17 comprises a scanner unit 20 as exposure equipment arranged for each process part 17, and a process cartridge 21 detachably installed on each process part 17. The scanner unit 20 comprises a laser emission part (not shown), a polygon mirror 22, a lens 23, and a reflecting mirror 24. In the scanner unit 20, a laser beam based on an image data emitted from the laser emission part is reflected onto the polygon mirror 22, passes through the lens 23, reflects onto the reflecting mirror 24, and emitted onto a photosensitive drum 25 described below.

Each process cartridge 21 is detachably configured inclining forward along the forward/backward direction and the vertical direction (the direction of the thickness of the paper 3), that is, inclining toward the rear in the upward/downward direction (the direction to which the upper side inclines on the front side), and comprises the photosensitive drum 25 as a photoreceptor, a scorotron electrifier 26, a developing roller 27, and a feed roller 28. The photosensitive drum 25 has a cylindrical shape, and comprises a drum main body 29 formed with a positively electrifiable photosensitive layer of which the outer layer mostly consists of a polycarbonate, etc., and a drum shaft 30 extending along the axial direction of the drum main body 29 at the center of the shaft of the drum main body 29. The drum main body 29 is rotatably arranged on the drum shaft 30, the drum shaft 30 being non-rotatably supported in the width direction by both walls (hereafter, the direction perpendicular to the forward/backward direction and the vertical direction) of the frame of the process cartridge 21. The photosensitive drum 25 is rotationally driven in the same direction (clockwise in the figure) as the direction of movement of the conveying belt 38 described below at the point of contact (image-forming location) with the conveying belt 38 during image formation.

The scorotron type electrifier 26 is a positive scorotron electrifier generating corona discharge and comprising a wire and a grid, and is arranged opposite the photosensitive drum 25 spaced apart so as not to contact each other at the rear of the photosensitive drum 25. The developing roller 27 is arranged opposite the photosensitive drum 25 abutting the upper side of the photosensitive drum 25. This developing roller 27 is configured by coating a roller part 32 made of an elastic member such as a conductive rubber material on a metal roller shaft 31.

The feeding roller 28 is oppositely arranged to the developing roller 27 at the upper side of the developing roller 27 and is pressed against developing roller 27. This feeding roller 28 is comprised of a metal roller shaft 33 covered with a roller part 34 made of a conductive sponge material. In addition, the roller shaft 33 is rotatably supported widthwise by both walls of the process cartridge 21.

The upper part of the process cartridge 21 is formed as a toner storage chamber 35 for storing toner in which each color of toner is stored. That is, in the toner storage chamber 35, each process part 17 is stored with a polymerized toner containing a positively electrifiable non-magnetic component having yellow in the yellow process part 17Y, magenta in the magenta process part 17M, cyan in the cyan process part 17C, and black in the black process part 17K, respectively.

In each process part 17, each color of toner stored in each toner storage part is supplied to the feeding roller 28 during the image-forming operation, and then supplied to the developing roller 27 by rotation of the feeding roller 28. At this time, the toner is positively electrified by the friction between the feeding roller 28 and the developing roller 27 to which the developing bias is applied.

The scorotron electrifier 26 generates corona discharge by applying an electrification bias to positively electrify the surface of the photosensitive drum 25 uniformly. The surface of the photosensitive drum 25 is exposed to a high speed scanning of the laser beam by the scanner unit 20 after being uniformly positively electrified by the scorotron electrifier 26 to form an electrostatic latent image corresponding to the image to be formed on the paper 3.

Then, when the photosensitive drum 25 further rotates, positively electrified toner carried on the surface of the developing roller 27 is supplied onto the electrostatic latent image formed on the surface of the photosensitive drum 25, that is, on the exposed portion where the electric potential is decreased by exposure to the laser beam on the surface of the photosensitive drum 25 which is uniformly positively electrified when the toner contacts the photosensitive drum 25 by means of the rotation of the developing roller 27. Thereby, the electrostatic latent image of the photosensitive drum 25 is made a visible image by means of reverse development of each color toner.

The transfer part 18 is arranged in the forward/backward direction on the upper side of the paper feeding part 4 in the main casing 2, and comprises a driving roller 36, a driven roller 37, the conveying belt 38, a transfer roller 39, and a belt cleaning device 40.

The driving roller 36 is arranged at a low height so as to not overlap with the photosensitive drum 25 at the rear of the photosensitive drum of process cartridge 21 installed in the black process part 17K. The driving roller 36 is rotationally driven in the direction opposite from the direction of rotation of the photosensitive drum 25 (counterclockwise in the figure) by a main motor (see FIG. 2, not shown in FIG. 1) during image formation.

The driven roller 37 is arranged on the upper side of the driving roller 36 in front of the photosensitive drum 25 of the process cartridge 21 installed in the yellow process part 17Y. This driven roller 37 is rotated in the same direction as the direction of movement of the conveying belt 38 at the point of contact with the conveying belt 38 described below during the rotational driving of the driving roller 36.

The conveying belt 38 is made of a resin, such as a conductive polycarbonate and a polyimide, in which a conductive particle, such as carbon, is dispersed. This conveying belt 38 is wound around the driving roller 36 and the driven roller 37. The driven roller 37 is driven by the driving roller 36, and the conveying belt 38 revolves so as to rotate in the same direction as the photosensitive drum 25, between the driving roller 36 and the driven roller 37, at the image-forming position where the conveying belt 38 oppositely contacts the photosensitive drum 25 of each process part 17.

The transfer roller 39 is arranged to sandwich the photosensitive drum 25 and the conveying belt 38 of each process part in the conveying belt 38 wound around the driving roller 36 and the driven roller 37. The transfer roller 39 comprises a metal roller shaft 41 covered with a roller part 42 made of an elastic material, such as a conductive rubber material. In addition, the transfer roller 39 is rotatably supported on a bearing (not shown) such that both sides of the roller part 41 have conductivity. The transfer roller 39 is configured such that the transfer bias is applied by the bearing.

The belt-cleaning device 40 is arranged in a relatively large space close to the driven roller 37 side (the space larger than that close to the driving roller 36 side) at the lower end of the conveying belt 38. The belt-cleaning device 40 comprises a cleaning box 46 and a cleaning roller 47. In the conveying belt 38, a back-up roller 110 opposing the cleaning roller 47 is provided.

The setting part 19 is arranged to the rear of the transfer part 18. The setting part 19 comprises a heating roller 48 and a pressurization roller 49. The heating roller consists of a metal-based pipe with a mold-releasing layer formed on the surface, and a halogen lamp provided along the axial direction. The surface of the heating roller 48 is heated to the setting temperature with the halogen lamp. The pressurization roller 49 is arranged so as to press the heating roller 48.

A color image transferred on the paper 3 is then conveyed to the setting part 19 and is set with heat while the paper 3 passes through between the heating roller 48 and the pressurization roller 49. The paper ejecting part 6 comprises a U-shaped path 50 on the paper ejecting side, a paper ejecting roller 51 and a paper receiving tray 52. The U-shaped path 50 on the paper ejecting side is formed as a conveying path for the nearly U-shaped paper 3 such that the upstream end is adjacent to the lower end of the setting part 19 to feed the paper 3 backward, and the downstream end is adjacent to upper end of the paper receiving tray 52 to convey the paper 3 forward.

The paper-ejecting roller 51 is arranged as one pair of rollers on the downstream end of the U-shaped path 50 on the paper ejecting side. The paper-receiving tray 52 is formed as an angled wall declining from front to back on the main casing 2. The paper conveyed from the setting part 19 is fed backward to the upstream end of the U-shaped path 50 on the paper ejecting side in which the direction of conveyance is switched, and the paper is ejected forward onto the paper-receiving tray 52.

Reading Unit

The reading unit 130 comprises the image scanner 134 and an ADF (not shown), the image scanner 134 is arranged so that the under surface opposes and covers the paper receiving tray 52 at the upper end of the paper receiving tray 52 of the image-forming unit 120.

The reading unit 130 is configured as a flatbed scanner. In the configuration of the flatbed scanner, the document base 134a is exposed when the ADF is opened backward, and is configured to be able to read a document by placing a book or other various documents on the document base 134a to be copied.

The document placed on the document base 134a can also be read using the ADF. When reading a document placed on the document base 134a, a CIS (Contact Image Sensor) 131 moves along a shaft 139 extending along the document base 134a in the direction of conveyance of the document, whereby the document placed on the document base 134a is read line-by-line. While, in the case of reading a document using the ADF, the CIS 131 moves to the end of the document base 134a and is held there, and the document conveyed by the ADF is read line-by-line. Wherein, the illustrative embodiment is configured so that the entire reading unit 130 is open around a shaft 140.

Illustrative Electrical Configuration

Figure 2:
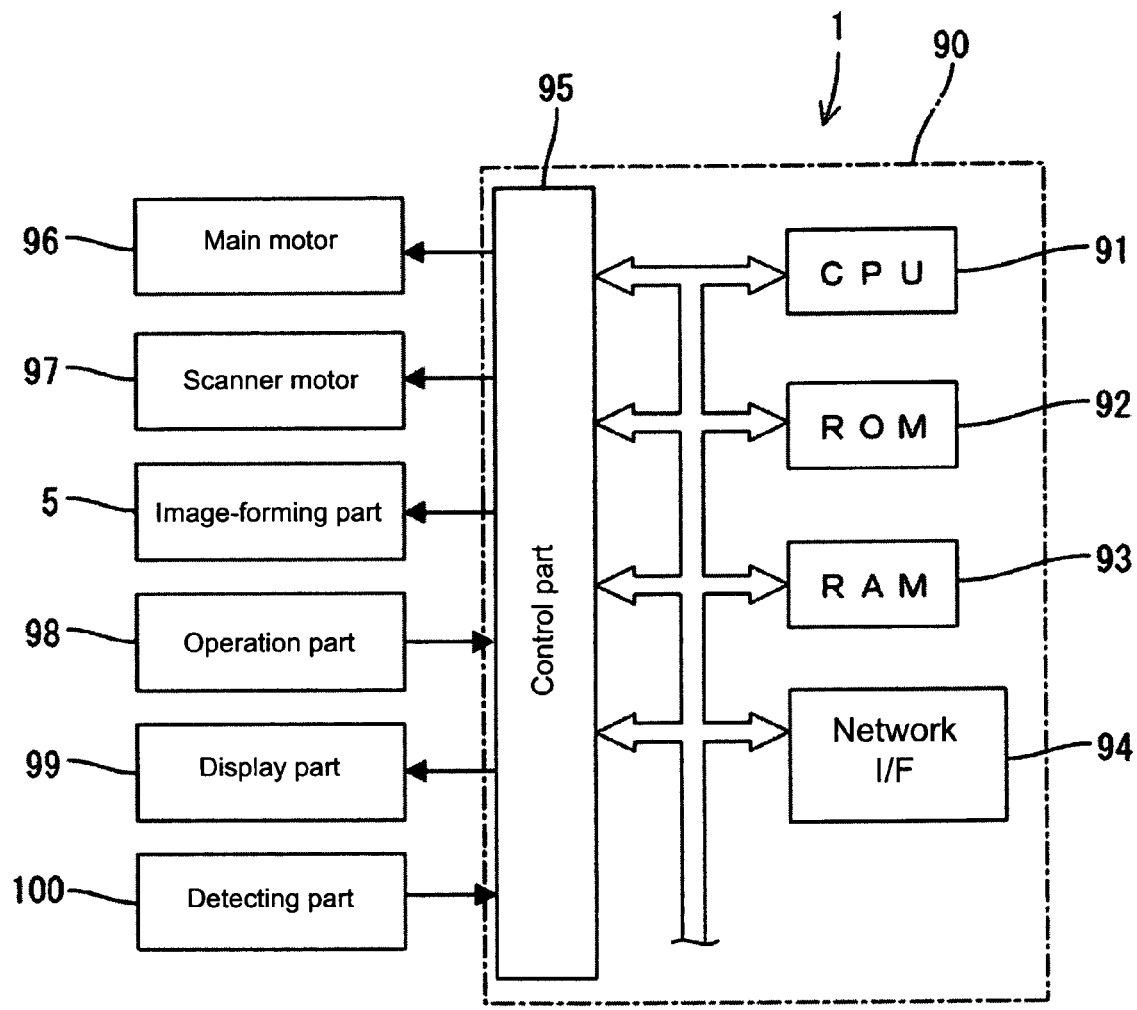
FIG. 2 is a block diagram conceptually showing the electrical configuration of the multifunction machine of FIG. 1 according to at least one illustrative aspect of the invention.

FIG. 2 is a block diagram conceptually showing the electrical configuration of the multifunction machine 1 in accordance with an illustrative embodiment. As shown in FIG. 2, a multifunction machine 1 comprises a control device 90 that controls each component by means of a control part 95 having a CPU 91, a ROM 92, a RAM 93, and an ASIC (Application Specific Integrated Circuit). Further, in an illustrative embodiment where the multifunction machine 1 is electrically connected to the control part 95, the multifunction machine 1 comprises an operation part 98 (the operation part 98 corresponds to an input means) including a main motor 96, a scanner motor 97, an image-forming part 5, and an input panel, a display part 99 including various lamps (the display part 99 corresponds to an informing means), and a detecting part 100 including various sensors. A control system is configured with the above.

The ROM 92 and the RAM 93 are connected to a CPU 91. The CPU 91 causes the RAM 93 to store the processing results in accordance with the processing procedure stored in the ROM 92 while controlling each component by means of the control part 95.

The main motor 96 is a motor used to rotate the above-mentioned conveying belt 38, etc. The scanner motor 97 is a motor used to rotate a polygon mirror 22 in a scanner unit 20. The CPU 91 executes driving control of the main motor 96 and the scanner motor 97 based on the program previously stored in the ROM 92. Wherein, in the present illustrative embodiment, the CPU 91 corresponds to means for suspending a calibrating process, and means for forcing the calibration process.

The control part 95 controls the image-forming part 5 in accordance with instructions from the CPU 91. Specifically, the control part 95 controls the exposure on the surface of the photosensitive drum 25 by controlling each part composing the scanner unit 20, and controls the transfer bias when toner is transferred onto the paper 3.

A control device 90 is provided with a network interface (network I/F) 94 for connecting to an external device such as a personal computer. A detecting part 100 comprises various sensors, the sensors being electrically connected to the control part 95.

Illustrative Configuration

An illustrative embodiment is configured such that a print job is printed by the image-forming part 5 corresponding to the means for printing, wherein the calibrating process during printing of a print job can be suspended. Further, while the calibrating process is suspended, when a predetermined condition is satisfied, the calibrating process is forced to a print job, and when the predetermined condition is not satisfied the calibrating process is not forced to the print job. An illustrative example is described below.

Figure 3:
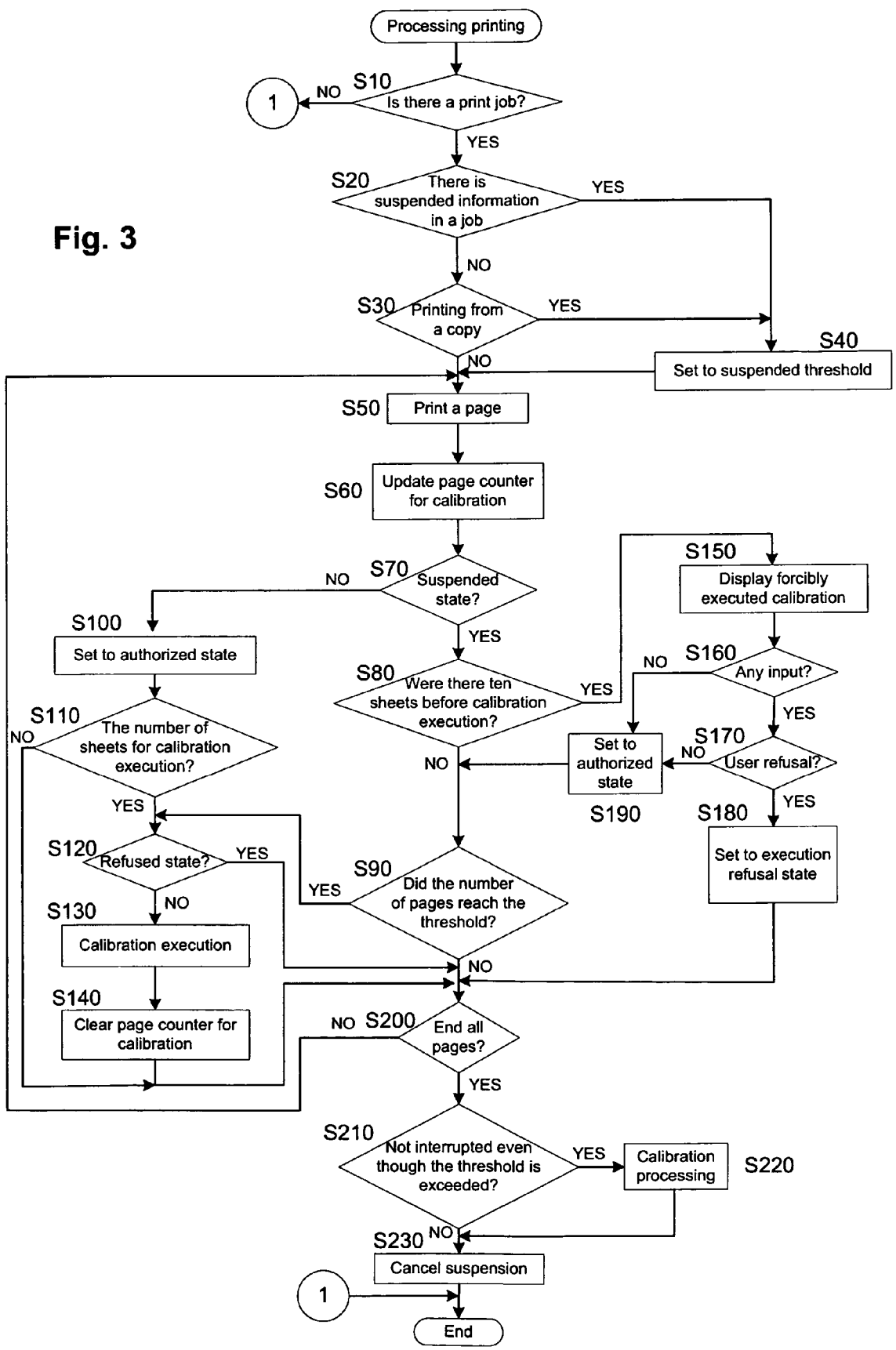
FIG. 3 is a flowchart exemplifying the flow of a print process according to at least one illustrative aspect of the invention.

FIG. 3 is a flowchart showing the flow of print processing. During print processing, first, in S10, determine whether there is a print job. When there is no print job, proceed to NO in S10 to complete the processing. When there is a print job, proceed to YES in S10, and in S20, determine whether there is suspension information for the print job. The suspension information is information instructing the suspension of the calibrating process for a print job for which a calibrating process will be executed. The suspension information, for example, is generated at the same time the print job is generated in the computer, where the suspension information is attached to the print job and included in the print job at the time of executing printing in the multifunction machine 1. And, when there is suspension information (that is, when the user generating the print job instructs the suspension), proceed to YES in S20, and in S40, the threshold determining the calibrating interval is set to the suspension threshold. In this illustrative embodiment, a default calibrating interval is set, and in S40, the threshold determining the calibrating interval is changed from a normal default threshold to the suspension threshold having a longer interval than that of the default. In the following discussion, as one example of the threshold, it is assumed that the normal threshold is 200 pages, and the suspension threshold is 300 pages. In this illustrative embodiment, the normal threshold and the suspension threshold are set according to the amount of printing, specifically, the number of pages, indicating that the calibrating process is executed every preset number of pages.

If there is no suspension information, proceed to NO in S20, and in S30, determine whether the print job is a print job based on a copy function. When the print job is printing based on the copy function, proceed to YES in S30, and the processing in the above-mentioned S40 (setting of the suspension threshold) is executed. When it is not printing based on the copy function, proceed to NO in S30. If proceeding to NO in S30, the default normal threshold will be employed as the threshold to determine the calibrating interval.

In this illustrative embodiment, two conditions are included in the suspension information for a print job or a print job based on the copy function. A suspension threshold is set with a longer interval (300 pages) than that of the normal threshold (a default interval of 200 pages), and the calibrating process is suspended even after exceeding 200 pages.

Wherein, in this illustrative embodiment, although the normal threshold is assumed to be a constant value (200 pages), the user is able to change the normal threshold. The normal threshold may be registered during the first registration or by a separate registration process. In addition, although a suspension threshold larger than the normal threshold set in S40 is previously registered as a constant value (300 pages), the user may be allowed to change (e.g. increase) the value. In this case, a second registration process to register the suspension threshold previously used in S40 may be provided separately.

Then, the printing of each page is carried out in S50. When the printing of a relevant page is completed, in S60, a page counter for calibrating is updated. The page counter for calibrating counts the number of printed pages from the last calibrating process. Then, in S70, determine whether the current job is in the suspended state or not (that is, whether the threshold to be set is the suspension threshold or not). When the print job is not in a suspended state but in a normal state (the threshold is the normal threshold), proceed to NO in S70, and in S100, the authorized state of the calibrating process is set.

Then, in S110, determine whether the number of sheets reached the threshold for execution of the calibrating process (that is, whether the page counter for calibrating reached the normal threshold); if not reached, proceed to NO in S110, and in S200, determine whether the printing of all pages of the print job is completed. If the number of sheets for execution of the calibrating process is reached (that is, when the page counter for calibrating reaches the normal threshold), proceed to YES in S110, and in S120, determine whether the calibrating process is currently set to the refusal state. If not and the permission state is set in the processing in S100 and S190, proceed to NO in S120, and in S130, the calibrating process is executed. The calibrating process is explained below. If the refusal state is set for the processing in S180 described below, proceed to YES in S120 where the calibrating process is not executed.

When the calibrating process in S130 is completed, in S140, the page counter for calibrating is cleared. In this illustrative embodiment, when the calibrating process is not suspended in the normal state (when proceed to NO in S30), the calibrating process is executed when a lesser condition (that is, when the number of printed pages reaches the normal threshold) than the predetermined condition (that is, when the number of printed pages reaching the suspension threshold) is satisfied.

Whereas, in S70, if the calibrating process in the print job is in the suspended state, proceed to YES in S70 and determine whether the number of sheets has reached the predetermined number of sheets (ten sheets here) to force the next calibrating process (that is, whether the calibrating process is executed within ten sheets or not). If ten sheets are reached before the execution of the calibrating process, proceed to YES in S80 where a query to force the calibrating process is displayed. That is, a query is made regarding whether to force the calibrating process. FIG. 4 shows an example display. For example, a user then may input 1 for refusal information and 2 for permission information.

Then, determine whether there is input within the predetermined time for the query; and if there is no input, proceed to NO in S160, and in S190 the permission state is generated for the calibrating process. If there is input within the predetermined time, proceed to YES in S160, and in S170 determine whether the input indicates refusal of the calibrating process. If refusal is indicated, proceed to YES in S170 where the refusal state is generated and the calibrating process is not forced. In this case, information as shown in FIG. 5 will be displayed on the display part 99. When permission is indicated, proceed to NO in S170, and in S190 the permission state is generated for the calibrating process. That is, the calibrating process is forced when the input is permission information.

When NO is determined in S80 or the processing in S190 is executed, in S90 determine whether the number of pages from the last calibrating process reached the threshold (suspension threshold), (that is, whether the page counter reached the suspension threshold or not). If the suspension threshold is reached, proceed to YES in S90 where the processing in the above-mentioned S120, S130, and S140 is executed. If the suspension threshold is not reached, proceed to NO in S90, and in S200, determine whether all pages of the print job are complete. As mentioned above, in this illustrative embodiment, according to the predetermined condition that the amount of printing (number of sheets for printing) exceeds the preset suspension threshold, the calibrating process is not forced.

In S200, determine if all pages are completed. If yes, proceed to YES in S200 and, if the suspension threshold is exceeded, determine whether the calibrating process was executed. If there was no calibrating process, proceed to YES in S210, and in S220, the calibrating process is executed. Although it is not shown in the figure, after executing the calibrating process in S220, the page counter for calibrating is cleared in the same manner as in S140. If there was a calibrating process, proceed to NO in S210. In this case, the calibrating process is executed after completion of printing of a print job for which the calibrating process is suspended.

Further, in S230, a suspension cancellation process is executed. If the suspension cancellation process is set according to the suspension threshold in S40, the threshold will return to the normal threshold. By configuring the suspension cancellation so as to cancel the suspension after completion of printing of the print job targeted for suspension of the calibrating process as mentioned above, deterioration of image quality can be effectively prevented.

Wherein, in this illustrative embodiment, the flow proceeds to NO in S160 until the result of the query is confirmed after querying in S150 (that is, in S160, until the permission or refusal for the calibrating process is input), and in S50, the print processing of the print job continues to be executed. Therefore, because the print processing is not stopped until the result of the query is obtained, providing effective and quick print processing.

Figure 6:
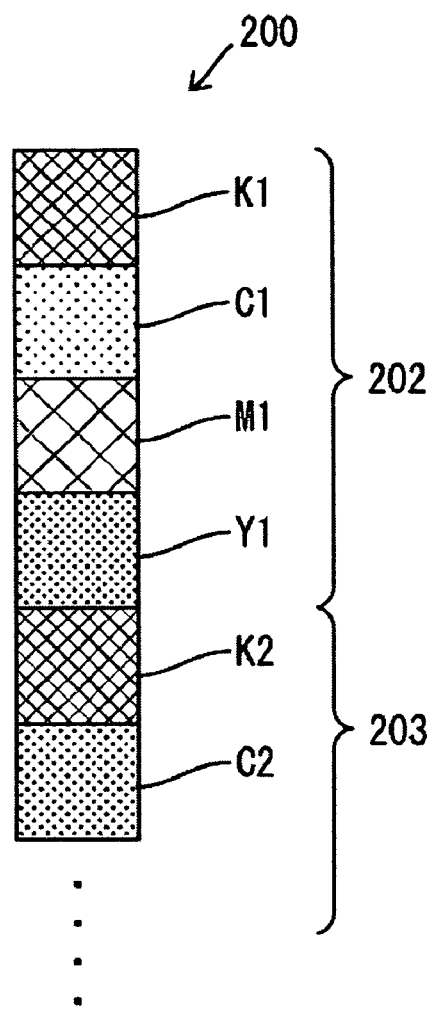
FIG. 6 is an explanatory drawing illustrating a density patch according to at least one illustrative aspect of the invention.

In addition, in the calibrating process in S130 or S220 in FIG. 3, an engine calibrating process and soft calibrating process described below may be executed. In the engine calibrating process, a density patch is formed and a density measurement processing is executed to measure the density of the density patch. In this density measurement processing, first, a patch line 200 as shown in FIG. 6 is printed on the conveying belt 38 (FIG. 1). This patch line 200 continues linearly and is formed on the conveying belt 38 so as to fit within one circular length around the revolving direction of the conveying belt 38. Wherein, the patch line is configured by combining the density patches configured by color. Specifically, a black density patch is configured by a black mark K1, K2, ..., K5 (K3 and K4 are omitted), a cyan density patch is configured by a cyan mark C1, C2, ..., C5 (C3 and C4 are omitted), and a magenta and a yellow density patch are also configured, the density patches being arranged such that the first density patch of each color is 202 and the second one is 203.

After the patch line 200 is formed, the density of each patch in the patch line 200 is measured. This is executed by measuring the patch line 200 on the conveying belt 38 with a density detection sensor (not shown) composing a part of the detecting part 100 by revolving the conveying belt 38. Wherein, because the patch line 200 is formed so as to fit within one circular length around the revolving direction of the conveying belt 38, the density detection sensor can measure the density of all patches in the patch line 200 by revolving the conveying belt 38 only one round. The measured density is stored as the measurement result in a memory means such as the RAM 93 or a nonvolatile memory (EEPROM, etc., not shown).

The soft calibrating process is an updating process that updates the correction table that executes the correction of an image density. That is, when the density of a density patch is measured by engine calibrating process and the density measurement result is stored in a memory means (RAM 98 or a nonvolatile memory, etc.) as mentioned above, in soft calibrating process, a correction table (gamma table) showing the correspondence between the input level given to a printer and the actual output level based on the results of the density measurement stored in the memory means is further generated to update the previously stored correction table.

In a soft calibrating process, the density on a printing media assumed according to the density value (0%, 10%, 15%, 20%, 25%, 30% gradation, etc.) obtained by measuring the patch on the conveying belt 38 in the engine calibrating process is used to calculate the density on a printing media corresponding to the gradation divided equally into 256 gradations from 0% to 100% by a conventional interpolation method (e.g., linear interpolation and quadratic curve interpolation). Then, correction data is calculated such that the density values are the ideal density, and the calculated data is stored as a correction table in the RAM 93 or a nonvolatile memory (not shown), and it comes to end.

The correction table as described above is used in gamma correction processing in the print processing in S50 of FIG. 3. Gamma correction processing is processing conducted to reflect the correction table prepared as described above as the correction value for the print data during printing. That is, this processing executes a correction based on the correction table such that the density in the print data about to be printed is in accordance with the density of the printed matter to be printed. After gamma correction processing and dithering processing, printing to paper is executed. During printing, the density of each color will be corrected by adjusting the pulse width of the laser beam and voltage applied to each developing roller and electrifier based on the correction reflected by the gamma correction processing.

Although a certain number of prints is exemplified as the amount of printing, any other value may be used to define the amount of printing. For example, the combined time of printing may be used as the amount of printing.

Further, in the processing in S160, when there is no input within a predetermined time, proceed to S190 where the permission state is set; however, in the processing in S160, when there is input within a predetermined time, proceed to S180 where the calibrating process refusal is set. That is, in this case, when there is no input within a predetermined time the calibrating process will be forced.

Aspects of the invention improve user convenience by enabling the calibrating process to be suspended during printing of a print job. When the calibrating process has been suspended, means for forcing the calibration process when a predetermined condition has been satisfied minimizes deterioration of image quality. The predetermined condition can be a condition reflecting the operating amount of the printing means. Moreover, the predetermined condition for the calibrating process can be changed according to whether or not the calibration process has been suspended. Therefore, conditions can be specified to correspond appropriately to each situation.

In a print job based on a copy function, a user often has to wait in front of an image-forming apparatus until the print job is complete. However, in accordance with aspects of the invention, the wait time can be reduced effectively for the copy function, which has the longest potential wait. Because a user can determine whether to give priority to image quality or processing speed, the range of user choices is widened and user convenience is further improved. Moreover print processing need not stop until permission information is input after querying by the informing means, enabling effective and quick print processing. Because the calibrating process may be executed after completing a job unrelated to the print process when a calibrating process is not executed, prevention of image quality deterioration can be assured. In addition, because suspension is canceled after completing a job unrelated to the print process, deterioration of image quality can be effectively prevented.

Because a user can determine whether or not to force the calibrating process during a print job, the range of user choices is widened and user convenience is improved. In addition, as for the calibrating process, the appropriate timing by which deterioration of image quality can be effectively prevented can be set. Further, because the print process is executed for a print job while obtaining the results of the query by the informing means, the print process can be accelerated as well.

While the various aspects of the invention have been described in conjunction with the example structures and methods described above, various alternatives, modifications, variations, improvements and/or substantial equivalents, whether known or that are or may be presently unforeseen, may become apparent to those having at least ordinary skill in the art. Accordingly, the example structures and methods, as set forth above, are intended to be illustrative of the invention, not limiting it. Various changes may be made without departing from the spirit and scope of the invention. Therefore, the invention is intended to embrace all known or later developed alternatives, modifications, variations, improvements and/or substantial equivalents

What is claimed is:

1. An image-forming apparatus comprising:
   means for printing a print job;
   means for suspending a calibrating process during printing of the print job if at least one of the following suspension conditions (A) and (B) is satisfied:
   (A) an instruction to suspend the calibrating process is done by a user, the calibrating process being to amend image density of the print job;
   (B) the print job is for a copy function;

means for executing the calibrating process when either of the two suspension conditions is not satisfied and an operating amount of the printing means reaches a normal threshold; and means for forcing the calibrating process in the print job, wherein, while one of the suspension conditions is satisfied and the calibrating process is suspended, when the operating amount of the printing means reaches a suspension threshold larger than the normal threshold, the calibrating process is forced in the print job, and when the operating amount of the printing means does not reach a suspension threshold, the calibrating process is not forced in the print job.

2. The image-forming apparatus according to claim 1, further comprising:

means for informing a query regarding the calibrating process prior to forcing the calibrating process in the print job; and means for inputting permission information, wherein
the forcing means forces the calibrating process in the print job when the permission information is input by the inputting means.

3. The image-forming apparatus according to claim 2, wherein the printing means prints the print job until the permission information is input by the inputting means after the query is sent by the informing means.

4. The image-forming apparatus according to claim 1, wherein when printing of the print job for which the calibrating process is suspended is completed while the calibrating process is not forced in the print job, the calibrating process is executed.

5. The image-forming apparatus according to claim 1, wherein the suspending means cancels the suspension of the calibrating process after the printing of the print job for which the calibrating process is suspended is completed.

* * * * *

UNITED STATES PATENT AND TRADEMARK OFFICE
CERTIFICATE OF CORRECTION

PATENT NO.        : 7,626,738 B2
APPLICATION NO. : 11/526590
DATED             : December 1, 2009
INVENTOR(S)       : Akihiro Yamada It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 379 days.

Signed and Sealed this

Second Day of November, 2010

David J. Kappos
*Director of the United States Patent and Trademark Office*